(12) United States Patent
Nittyinperä et al.

(10) Patent No.: US 10,063,949 B2
(45) Date of Patent: Aug. 28, 2018

(54) TRANSDUCER IN A CASING HAVING AN OUTPUT WINDOW

(75) Inventors: Mika Nittyinperä, Raisio (FI);
Benedict Slotte, Turku (FI); Anders Engberg, Billnas (FI); Tapio Liusvaara, Tampere (FI)

(73) Assignee: Nokia Technologies Oy, Espoo (FI)

( * ) Notice: Subject to any disclaimer, the term of this patent is extended or adjusted under 35 U.S.C. 154(b) by 108 days.

(21) Appl. No.: 14/389,251

(22) PCT Filed: Apr. 11, 2012

(86) PCT No.: PCT/IB2012/051767
§ 371 (c)(1),
(2), (4) Date: Jan. 8, 2015

(87) PCT Pub. No.: WO2013/153417
PCT Pub. Date: Oct. 17, 2013

(65) Prior Publication Data
US 2015/0296281 A1    Oct. 15, 2015

(51) Int. Cl.
| | |
|---|---|
| *H04R 1/26* | (2006.01) |
| *H04R 1/02* | (2006.01) |
| *H04M 1/03* | (2006.01) |
| *H04R 1/28* | (2006.01) |
| *H04M 1/18* | (2006.01) |

(52) U.S. Cl.
CPC ............ *H04R 1/02* (2013.01); *H04M 1/035* (2013.01); *H04R 1/28* (2013.01); *H04M 1/18* (2013.01); *H04R 2499/11* (2013.01); *H04R 2499/15* (2013.01)

(58) Field of Classification Search
CPC   H04R 2209/024; H04R 1/00; H04R 2499/11; H04R 9/06; H04R 2499/15

USPC .................................. 381/87, 332, 334–336
See application file for complete search history.

(56) References Cited

U.S. PATENT DOCUMENTS

| | | | |
|---|---|---|---|
| 5,784,471 A | 7/1998 | Bebenroth | |
| 7,564,986 B2 * | 7/2009 | Sekino | B06B 1/0292 381/160 |
| 2004/0043801 A1 | 3/2004 | Shimokawatoko et al. | |

(Continued)

FOREIGN PATENT DOCUMENTS

| | | |
|---|---|---|
| CN | 1292194 A | 4/2001 |
| CN | 1817021 A | 8/2006 |

(Continued)

OTHER PUBLICATIONS

International Search Report received for corresponding Patent Cooperation Treaty Application No. PCT/IB2012/051767, dated Apr. 8, 2013, 5 pages.

(Continued)

*Primary Examiner* — George C Monikang
(74) *Attorney, Agent, or Firm* — Harrington & Smith

(57) ABSTRACT

A transducer comprising: an air displacement component configured to move on application of an electrical signal to generate an acoustic wave in a first plane in the direction of the movement of the air displacement component; a transducer casing configured to mechanically support the air displacement component, wherein the transducer casing comprises at least one output window located and acoustically coupled to the air displacement component in a second plane.

27 Claims, 13 Drawing Sheets

(56) References Cited

U.S. PATENT DOCUMENTS

| | | | |
|---|---|---|---|
| 2007/0116321 A1 | 5/2007 | Jang et al. | |
| 2009/0156273 A1 | 6/2009 | Romesburg et al. | |
| 2010/0189284 A1* | 7/2010 | Kuze | H04R 3/002 |
| | | | 381/120 |

FOREIGN PATENT DOCUMENTS

| | | |
|---|---|---|
| CN | 1972333 A | 5/2007 |
| CN | 101361400 A | 2/2009 |
| EP | 1489879 | 12/2004 |
| EP | 1791391 A2 | 5/2007 |
| EP | 1496676 | 11/2011 |
| JP | 2008-182391 A | 8/2008 |
| WO | 2000/027096 A1 | 5/2000 |

OTHER PUBLICATIONS

Extended European Search Report received for corresponding European Patent Application No. 12873906.7, dated Jan. 4, 2016, 8 pages.
Foreign Office Action received for corresponding Chinese Patent Application No. 201280072336.8 dated Nov. 28, 20165 pgs.

* cited by examiner

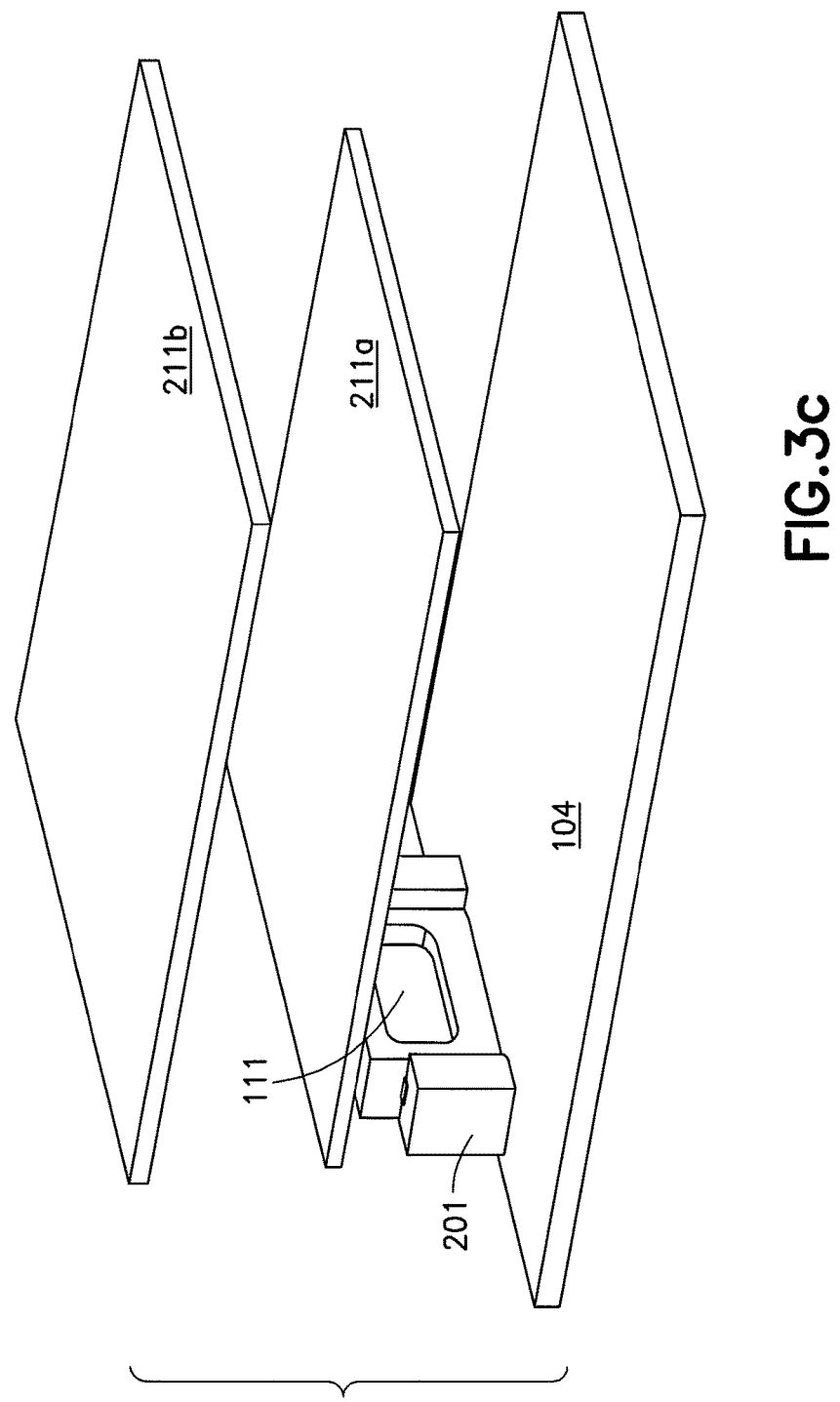

TRANSDUCER IN A CASING HAVING AN OUTPUT WINDOW

RELATED APPLICATION

This application was originally filed as PCT Application No. PCT/IB2012/051767 filed Apr. 11, 2012.

FIELD

The present application relates to speaker and transducer apparatus. In some embodiments the apparatus relates to speaker and transducer apparatus for mobile apparatus.

BACKGROUND

Some portable electronic devices comprise transducers such as loudspeakers and/or earpieces which are required to be small in size. Transducers are important components in electronic devices such as mobile phones for the purposes of playing back music or having a telephone conversation. The quality and loudness of a transducer in an electronic device are important especially where a user listens to sounds generated by an electronic device at a distance from the electronic device.

Conventional speaker or acoustic transducer apparatus is configured to generate an acoustic wave broadly in the direction of movement of the transducer and are typically wider than they are deep. A common use for such transducers is as a loudspeaker or earpiece in a mobile device. However to maintain reasonable audio quality and pass operator and type approval requirements the transducer operating as an earpiece or loudspeaker has a defined minimum volume.

SUMMARY OF SOME EMBODIMENTS

There is provided according to a first aspect of the application a transducer comprising: an air displacement component configured to move on application of an electrical signal to generate an acoustic wave in a first plane in the direction of the movement of the air displacement component; a transducer casing configured to mechanically support the air displacement component, wherein the transducer casing comprises at least one output window located and acoustically coupled to the air displacement component in a second plane.

The output window may be an edge output window and the angle between the first plane and the second plane is substantially in the range from 45 to 135 degrees.

The first plane and the second plane may be substantially perpendicular.

An apparatus may comprise the transducer as discussed herein, the apparatus may comprise an apparatus output window located and acoustically coupled to the air displacement component configured to output the acoustic wave in a third plane, wherein the angle between the first plane and the third plane may be substantially in the range from 45 to 135 degrees, and wherein the transducer casing output window may be a front output window acoustically coupled to the air displacement component and substantially open along the first plane.

The apparatus may comprise an acoustic coupling configured to acoustically couple the transducer casing front output window and the apparatus output window.

The apparatus may further comprise a printed wiring board, wherein the transducer is coupled to the printed wiring board.

The transducer may comprise: a height configured to be a longest physical dimension and is defined by an air displacement component width; and a width configured to be a shortest physical dimension and is defined by a maximum displacement of the air displacement component.

The air displacement component may be a vibrating membrane.

According to a second aspect there is provided a method of operating a transducer comprising: moving an air displacement component on application of an electrical signal to generate an acoustic wave in a first plane in the direction of the movement of the air displacement; mechanically supporting the air displacement component; providing at least one output window in the transducer casing located and acoustically coupled to the air displacement component in a second plane.

The output window may be an edge output window and the angle between the first plane and the second plane is substantially in the range from 45 to 135 degrees.

The first plane and the second plane may be substantially perpendicular.

The method may comprise: providing an apparatus output window in a third plane acoustically coupled to the transducer, wherein the angle between the first plane and the third plane is substantially in the range from 45 to 135 degrees; and providing at least one output window in the transducer casing comprises providing a front output window acoustically coupled to the air displacement component and substantially open along the first plane.

The method may further provide an acoustic coupling between the transducer casing front output window and the apparatus output window.

According to a third aspect there is provided a transducer comprising: means for generating an acoustic wave by displacing air on application of an electrical signal in a first plane in the direction of the air displacement; means for mechanically supporting the means for generating an acoustic wave, wherein the means for mechanically supporting comprises an means for permitting the exiting of the acoustic wave located and acoustically coupled to the means for generating an acoustic wave in a second plane.

The means for permitting the exiting of the acoustic wave may be an edge output window and the angle between the first plane and the second plane is substantially in the range from 45 to 135 degrees.

The first plane and the second plane may be substantially perpendicular.

An apparatus may comprise the transducer as discussed herein, the apparatus may comprise means for permitting the exiting of the acoustic wave from the apparatus located and acoustically coupled to the air displacement component configured to output the acoustic wave in a third plane, wherein the angle between the first plane and the third plane may be substantially in the range from 45 to 135 degrees, wherein the transducer means for permitting the exiting of the acoustic wave may be a front output window acoustically coupled to the air displacement component and substantially open along the first plane.

The apparatus may further comprise means for acoustically coupling the transducer means for permitting the exiting of the acoustic wave and the apparatus means for permitting the exiting of the acoustic wave.

The means for generating an acoustic wave may be a vibrating membrane.

BRIEF DESCRIPTION OF DRAWINGS

For a better understanding of the present application and as to how the same may be carried into effect, reference will now be made by way of example to the accompanying drawings in which:

FIGS. 3a to 3d illustrate schematic isometric projection diagrams of apparatus incorporating a speaker or acoustic transducer according to some embodiments;

DETAILED DESCRIPTION OF SOME EMBODIMENTS

The following describes apparatus and methods for loudspeaker or acoustic transducer configurations and package arrangement suitable for generating audio signals.

Figure 1:
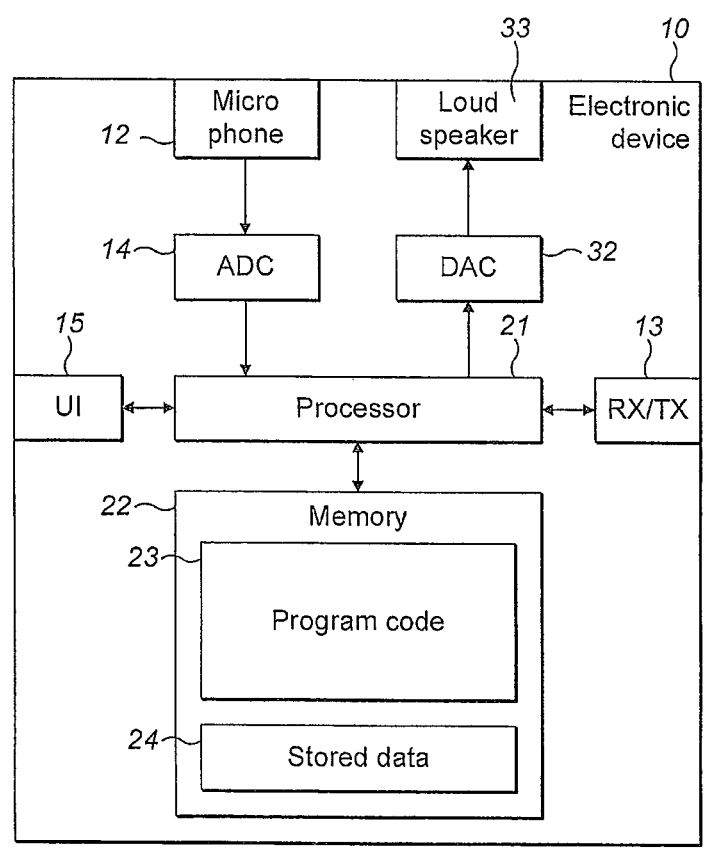
FIG. 1 illustrates a schematic block diagram of an apparatus according to some embodiments.

FIG. 1 discloses a schematic representation of an electronic device or apparatus 10 comprising a transducer or speaker 33. The transducer 33 may be an integrated speaker such as an integrated hands free speaker (IHF), loudspeaker or an earpiece. In some other embodiments the transducer can be integrated with the cover or another apparatus/phone part to form a speaker box.

The transducer 33 in some embodiments can be any suitable speaker type. For example in some embodiments the transducer can comprise an electrodynamic transducer. Additionally or alternatively the transducer 33 comprises a multifunction device (MFD) component having any of the following; combined earpiece, integrated handsfree speaker, vibration generation means or a combination thereof.

The apparatus 10 in some embodiments can be a mobile phone, portable audio device, or other means for playing sound. The apparatus 10 has a sound outlet for permitting sound waves to pass from the transducer 33 to the exterior environment.

The apparatus 10 is in some embodiments a mobile terminal, mobile phone or user equipment for operation in a wireless communication system.

In other embodiments, the apparatus 10 is any suitable electronic device configured to generate sound, such as for example a digital camera, a portable audio player (mp3 player or similar), a portable video player (mp4 player or similar) and a portable computer, for example a laptop PC. In some other embodiments the apparatus 10 can be any suitable audio or audio subsystem component or any suitable audio capture/audio rendering device In some embodiments, the apparatus 10 comprises a sound generating module which is linked to a processor 21. The processor 21 can be configured to execute various program codes. The implemented program codes may comprise a code for controlling the transducer 33 to generate sound waves.

The implemented program codes in some embodiments can be stored for example in the memory 22 within a program code section 23 for retrieval by the processor 21 whenever needed. The memory 22 could further provide a section 24 for storing data, for example data that has been processed in accordance with the embodiments. The code can, in some embodiments, be implemented at least partially in hardware or firmware.

In some embodiments the processor 21 is linked via a digital-to-analogue converter (DAC) 32 to the transducer 33. The digital to analogue converter (DAC) 32 can be any suitable converter.

In some embodiments the apparatus can comprise sound capturing components such as microphone 12 and analogue to digital converter (ADC) 14 coupled to the processor 21.

In some embodiments the DAC 32 sends an electronic audio signal output to the transducer 33 and on receiving the audio signal from the DAC 32, the transducer 33 generates acoustic waves. In other embodiments, the apparatus 10 receives control signals for controlling the transducer 33 from another electronic device.

The processor 21 can be further linked to a transceiver (TX/RX) 13, to a user interface (UI) 15 and to a display (not shown). The user interface 15 can enable a user to input commands or data to the apparatus 10. Any suitable input technology can be employed by the apparatus 10. It would be understood for example the apparatus in some embodiments could employ at least one of a keypad, keyboard, mouse, trackball, touch screen, joystick and wireless controller to provide inputs to the apparatus 10.

Figure 5A:
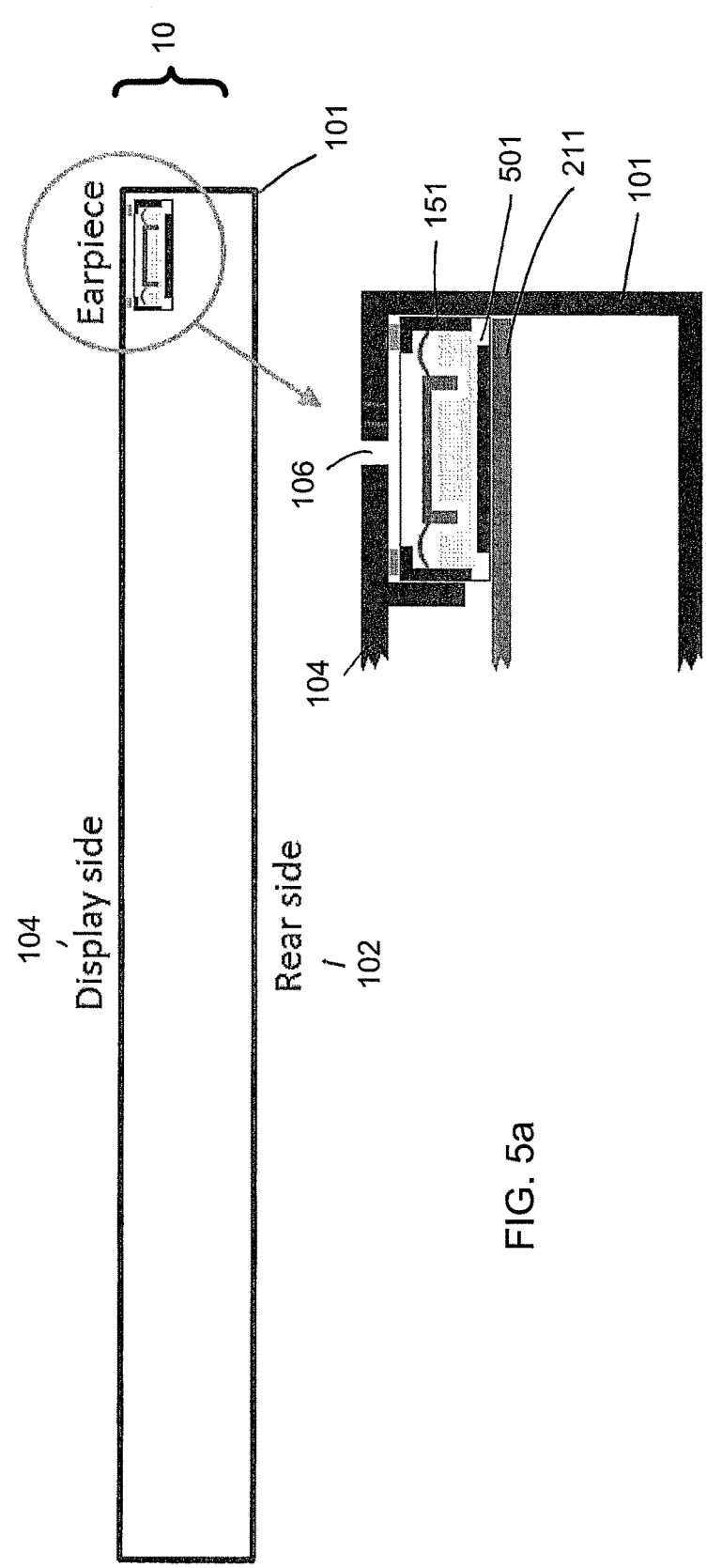
FIGS. 5a and 5b illustrate schematic diagrams of a conventional apparatus and transducer configuration.
Figure 5B:
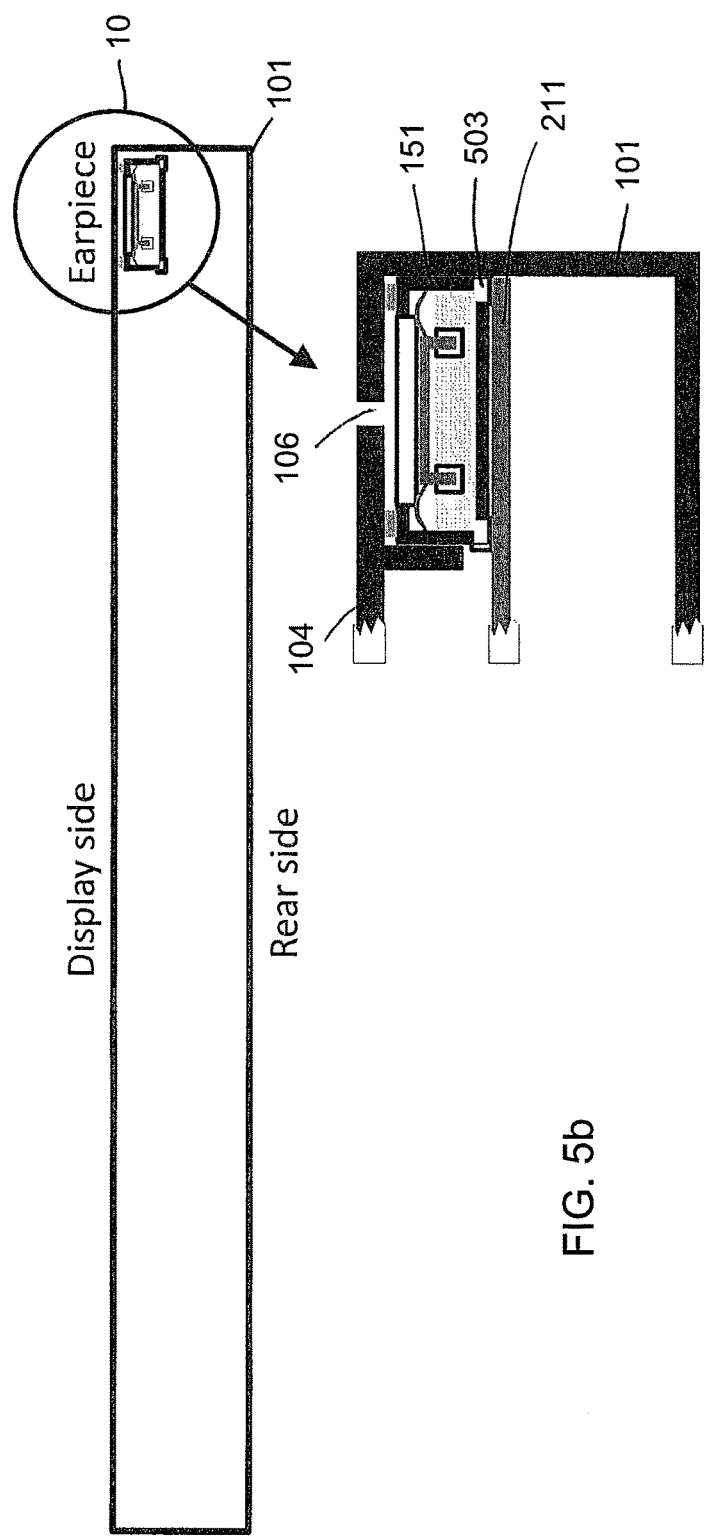
Figure 6A:
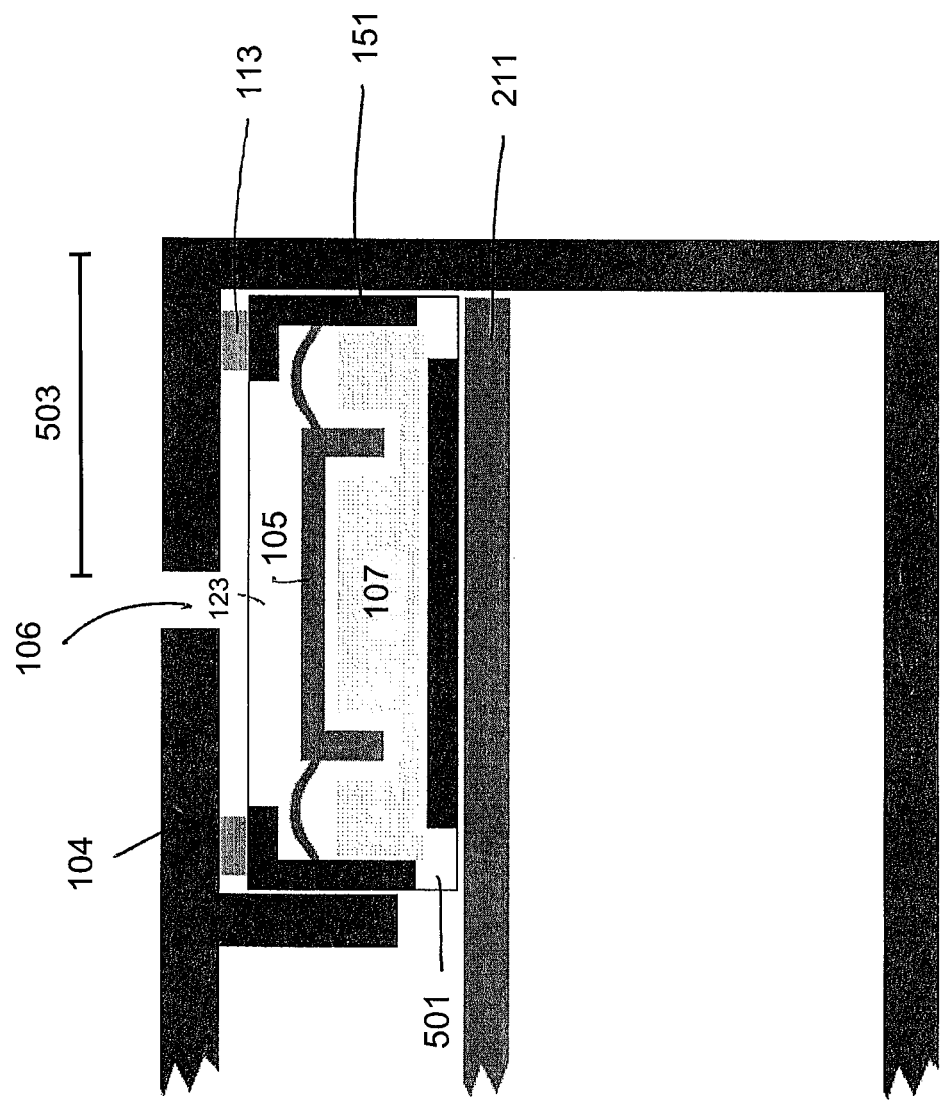
FIGS. 6a and 6b illustrate schematic diagrams of the transducer of FIGS. 5a and 5b in further detail.

As discussed herein the earpiece or loudspeaker transducer configuration requires a defined minimum volume within the apparatus. With respect to FIGS. 5a, 5b, 6a and 6b schematic views of typical mechanical layout configurations for transducers are shown. The casing 101 of the apparatus or device typically has a front or display side 104 and a rear side 102. As shown in the insert of FIGS. 5a and 5b, and represented in further detail in FIGS. 6a and 6b the display side 104 typically has at least one acoustic window 106 and adjacent to the at least one acoustic window is the transducer 151 mounted to the printed wiring board (PWB) 211 (or similar printed circuit board (PCB)). However it would be understood that sometimes the printed wiring board or similar PCB is not near the transducer or supporting the transducer. Furthermore it would be understood that the coupling between the transducer and the PWB (and/or PCB) can be a flex connector. The transducer 151 is configured to acoustically coupled to the casing acoustic window 106 via an acoustic gasket 113 configured to define a front volume or chamber between a vibrating membrane 105 and the acoustic window 106 and permits the generation of acoustic waves in a direction substantially in line with the motion of the membrane. However it would be understood that the chamber could also be missing or be negligibly small, so the loudspeaker would be more or less directly coupled to the casing acoustic window 106. To produce acoustic waves of sufficient levels the volume swept by the membrane 105 as controlled by the magnetic field generated by the magnet 107 is typically wide but shallow. The orientation of the transducer 151 is as shown in FIGS. 5a and 6a is such that the transducer 151 is acoustically coupled to the acoustic window or windows 106 in the casing 101 of the apparatus via a transducer acoustic window 123 which is substantially in line with the direction of motion of the vibrating membrane. In the example shown FIGS. 5b and 6b, the transducer acoustic window 123 is partially sealed by a dustproof gasket 125 which is configured to permit air to pass but not allow the entrance of dust or other foreign objects to the transducer.

Furthermore as shown in FIGS. 5a and 6a in some examples the transducer 151 can be configured with rear acoustic openings 501 to the rear of the vibrating membrane 105. In some circumstances the rear acoustic openings 501 open into a rear acoustic or closed chamber, for example where the transducer is being implemented within an integrated hands free component.

Figure 6B:
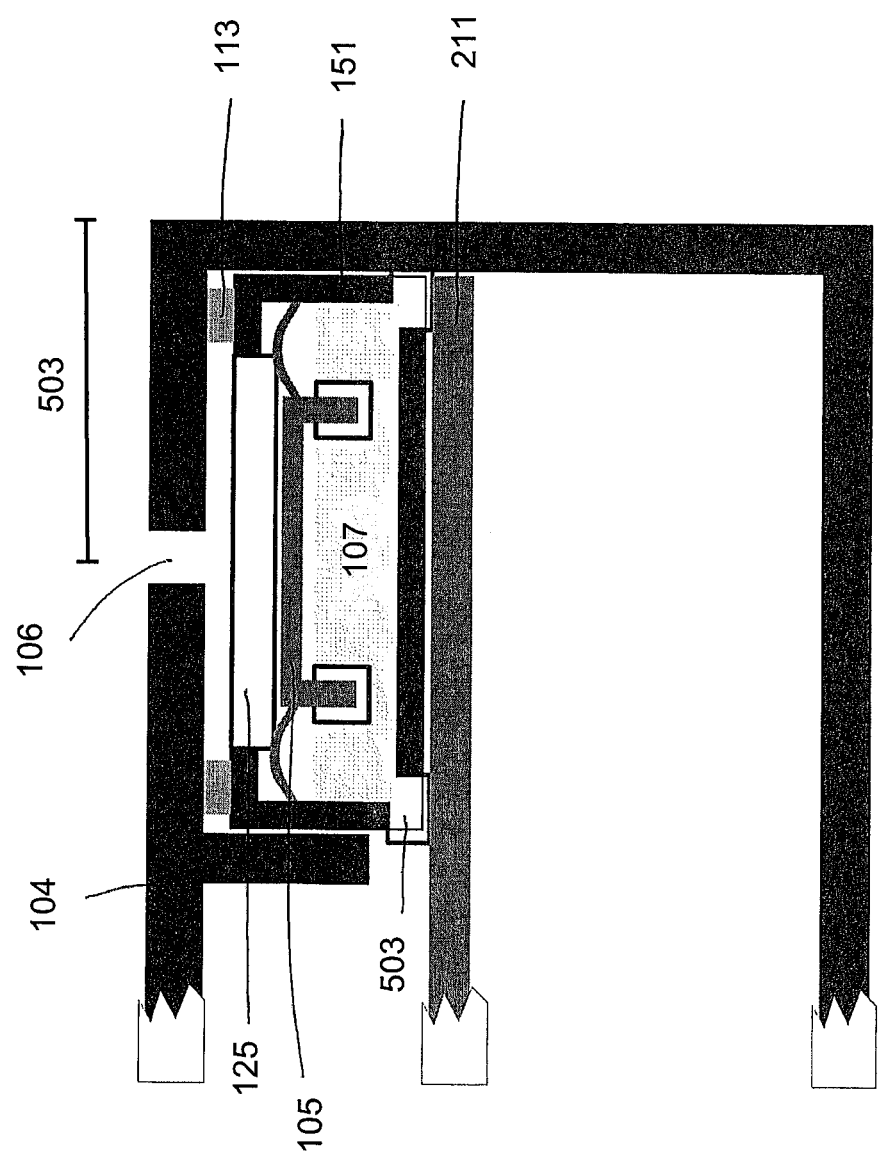

In some embodiments, such as shown in the example shown in FIGS. 5b and 6b, the rear acoustic openings to the rear of the vibrating membrane 105 are partially sealed by a rear dustproof gasket 503 configured to permit air to pass but not allow the entrance of dust or other foreign objects to the transducer.

Such 'wide and shallow' mechanical structures which produce suitable acoustic outputs are not in line or step with current industrial design trends for portable/mobile devices. Current industrial design trends for portable/mobile devices are for 'frame less' or minimum frame or bezel devices with a maximum area of display for the device frontal area. However implementing a 'wide and shallow' transducer requires the mobile device case to extend past the acoustical output to encompass the full width of the transducer, as shown by the dimension 503 in FIGS. 6a and 6b. In other words there is a compromise between audio quality and the width of the vibrating membrane 105 and the area required between the upper edge of the display and the upper edge of the mobile device in order to accommodate the transducer.

The transducers as described herein and shown in FIGS. 2 to 4 permit a loudspeaker configuration which is able to more easily be accommodated within the mobile devices and apparatus and do not require a wide bezel or spacing arrangement between the display and edge of the apparatus.

In such embodiments the transducer mechanical configuration or packaging is effectively rotated along one of the horizontal axis. It would be understood that by rotating the mechanical configuration the effect of the longest dimension defined by the membrane 105 contribution to the width of the transducer decreases. It would be understood that in such embodiments the effect of the longest dimension defined by the membrane 105 contribution to the height of the transducer increases the transducer height. In other words the transducer changes from a 'wide and shallow' configuration to a 'narrow and deep' configuration. It would be understood that in some embodiments the effective rotation can be less than 90 degrees, where a smaller rotation would be a compromise between the width and thickness of the transducer package.

Figure 2A:
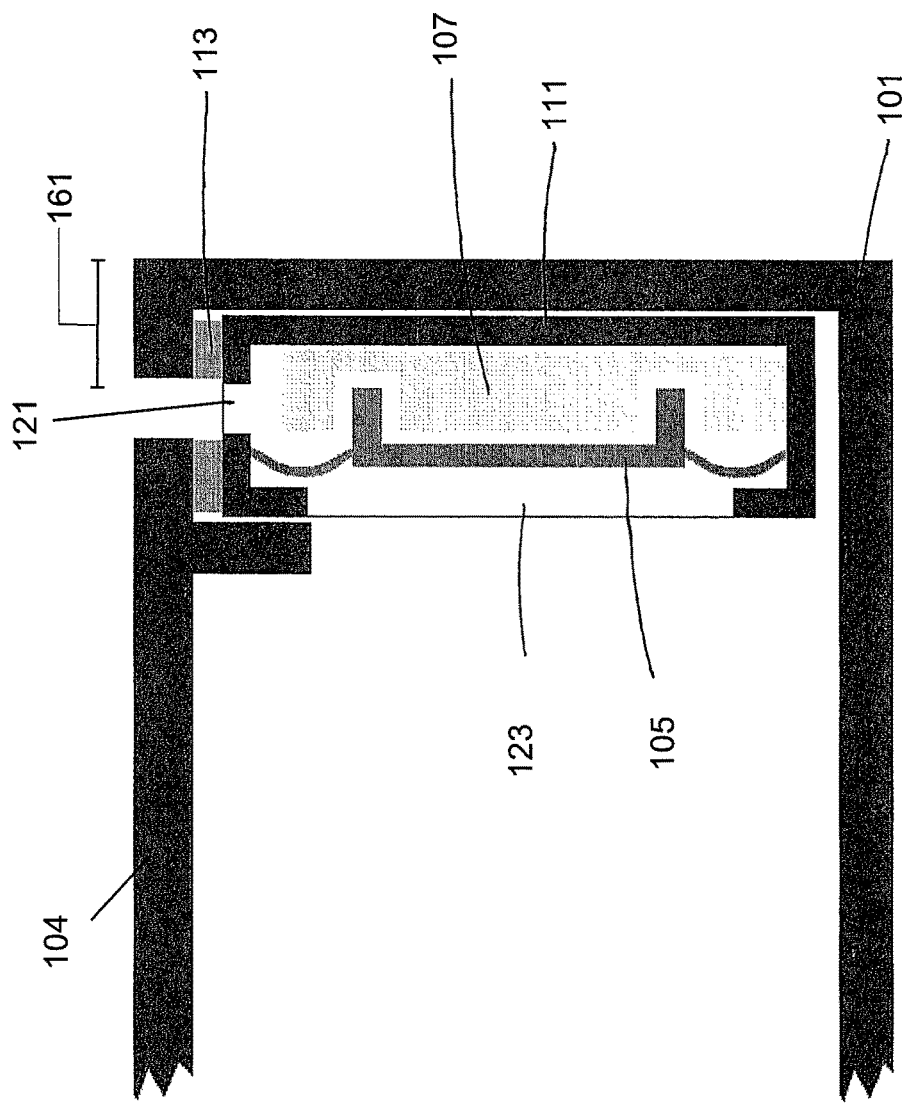
FIGS. 2a and 2b illustrate schematic diagrams of an apparatus incorporating a speaker or acoustic transducer according to some embodiments.
Figure 2B:
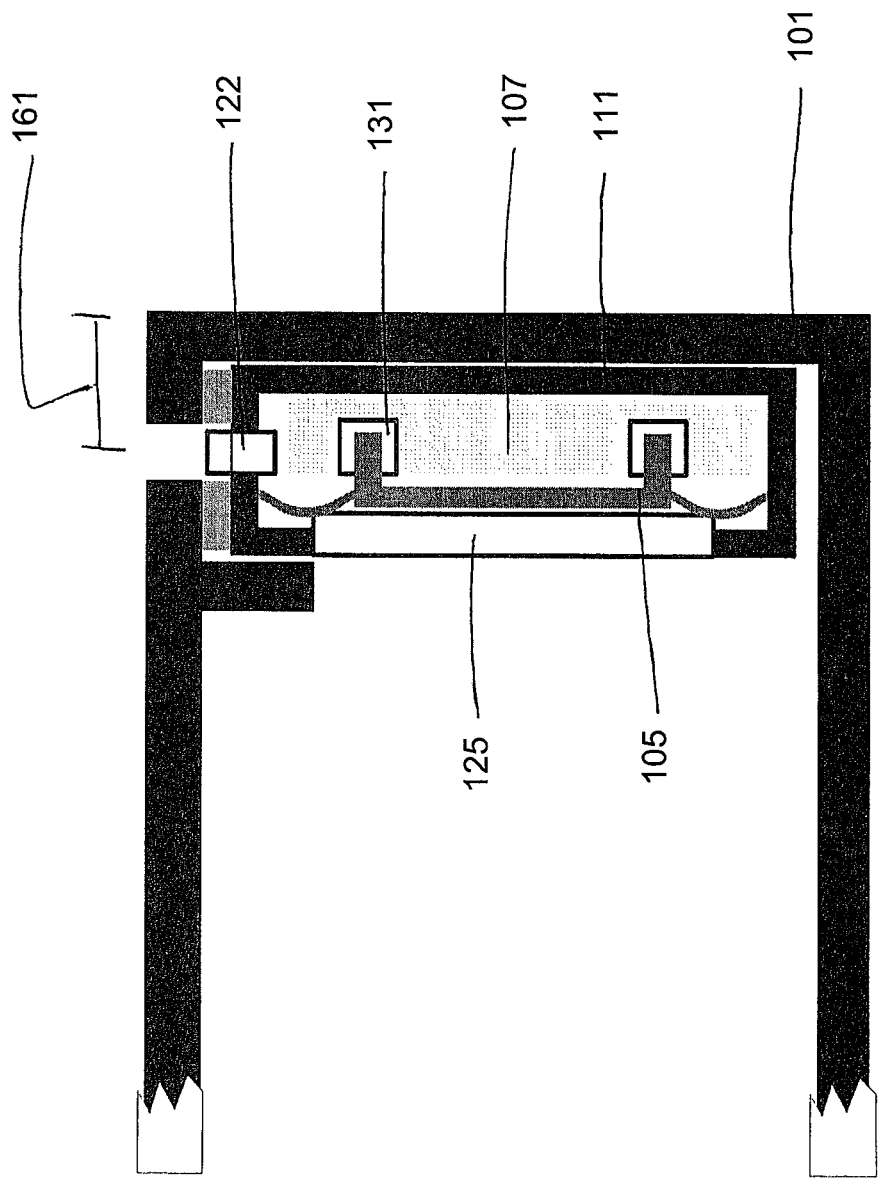
Figure 3A:
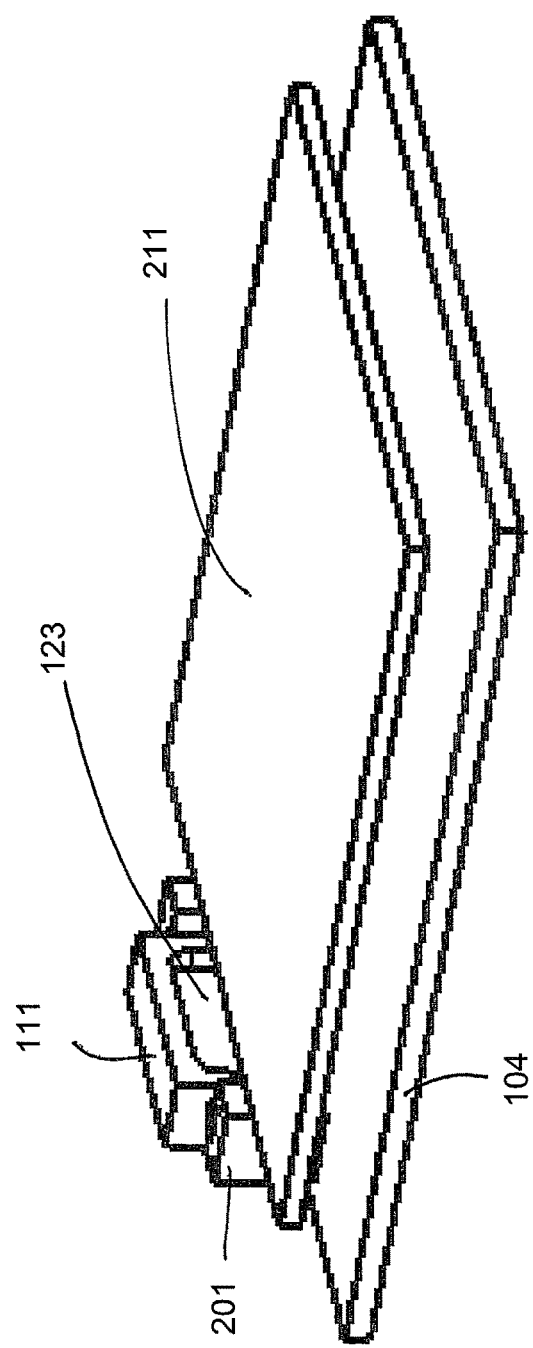
Figure 3B:
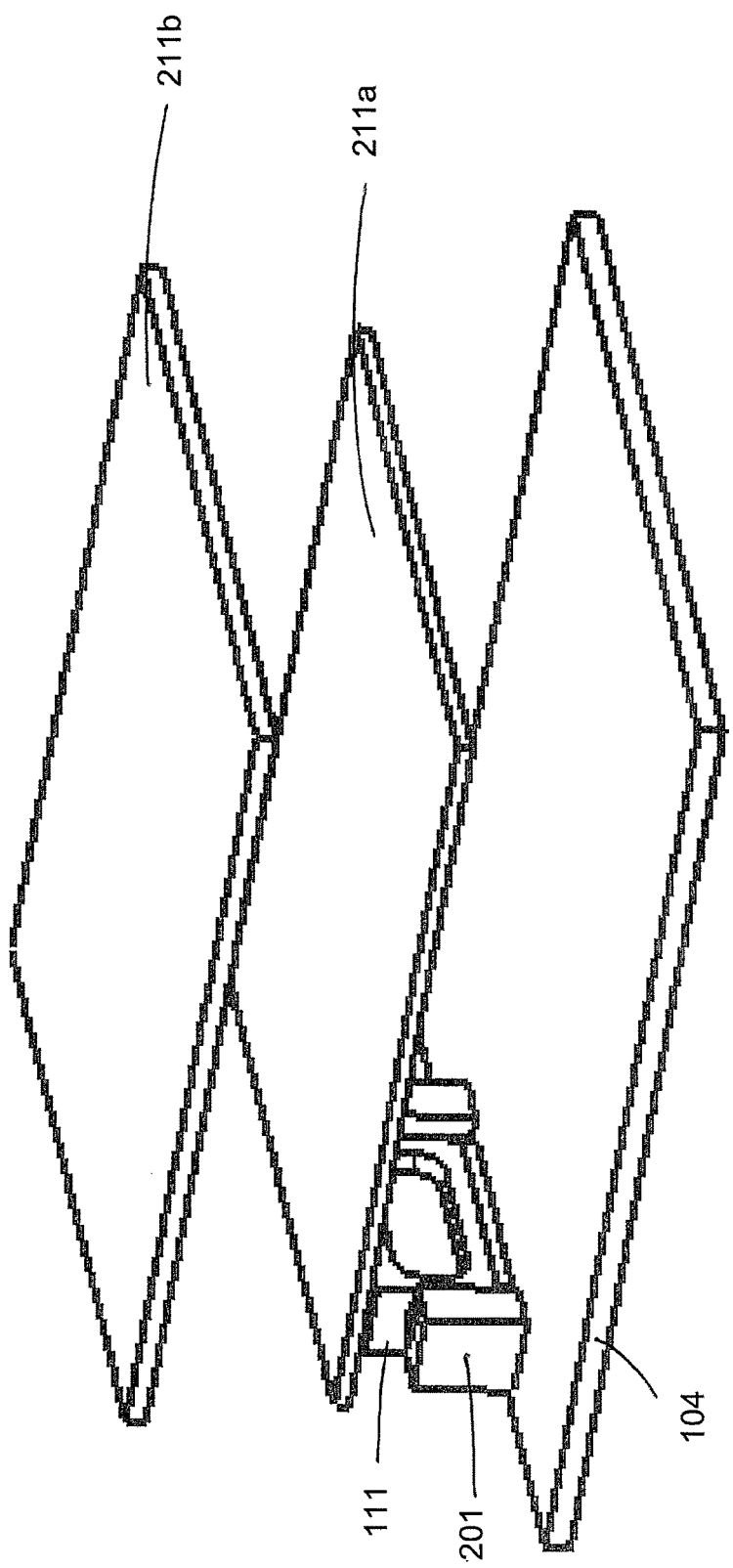
Figure 3D:
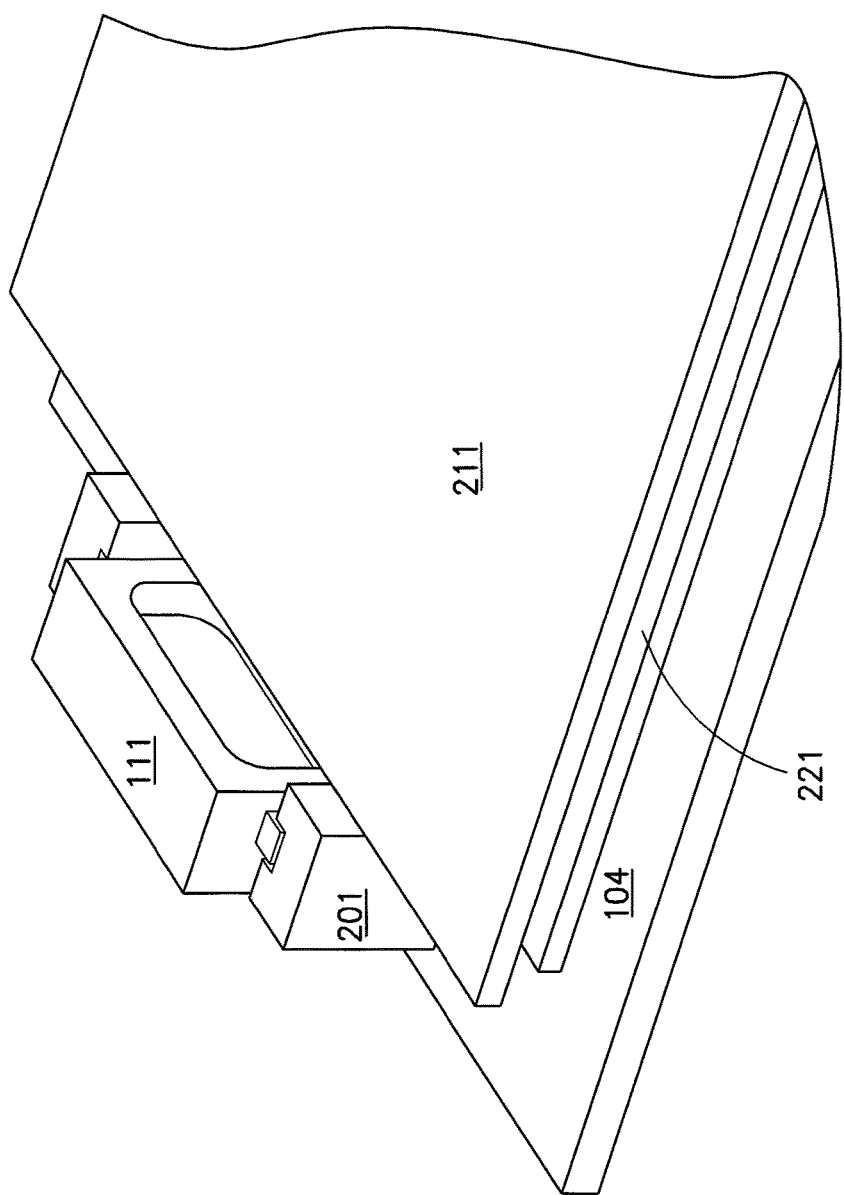

For example in some embodiments as shown in FIGS. 2a and 2b the transducer 111 is rotated substantially 90 degrees (or pi/2 radians) in other words the transducer vibrating membrane, means for generating an acoustic wave, air displacement component or similar is substantially perpendicular to the plane defined by the front cover 104 (and printed wire board (PWB)) of the apparatus.

The loudspeaker or transducer 111 as shown in FIG. 2a differs from the transducer shown in FIGS. 5a and 6a (and similarly the example shown in FIG. 2b differs from the transducer shown in FIGS. 5b and 6b) not only in being rotated but that the rear acoustic openings 501 are moved to the edge or side of the transducer casing to form at least one transducer side acoustic opening 121, or transducer side acoustic window. In such embodiments the transducer side acoustic window 121 is acoustically coupled, via the acoustic gasket 113 to the casing 101 front side 104 acoustic window permitting acoustic waves to pass from the transducer 111 to the environment. In alternative embodiments, the transducer 111 can comprise at least one transducer side acoustic window 121, at least one rear acoustic opening 501 and at least one transducer acoustic window 123. In some embodiments the transducer is directly acoustically coupled to the acoustic window of the casing, in other words there is no gasket or indirect coupling between the transducer (at least one side window) and the casing of the apparatus.

It would be understood that although in the examples shown with respect to FIGS. 2 to 4 the at least one transducer edge or transducer side acoustic window is coupled to the front of the casing and specifically to a front acoustic window for the casing that there can in some embodiments be at least one transducer edge or transducer side acoustic window acoustically coupled to the rear of the casing. Furthermore in some embodiments there can comprise transducer side acoustic windows coupling both the front and the rear of the casing.

The transducer 111 in some embodiments comprises at least one further or transducer front acoustic window 123 'in front' of the transducer vibrating membrane 105 which defines a 'front volume or chamber' between the vibrating membrane 105 and the interior of the apparatus 10. In some embodiments the further or transducer front acoustic window can be coupled to the casing acoustic window. In some embodiments the transducer front acoustic window 123 can be coupled to one side of the casing with the transducer side acoustic window 121 coupled to the other side. For example the transducer front acoustic window 123 can be coupled to the rear of the apparatus casing with the transducer side acoustic window 121 coupled to the front of the apparatus casing. In some embodiments the couplings can be vice versa, or both on the front of the apparatus casing, both on the rear of the apparatus casing, or at least one on the edge or side of the apparatus casing.

In some embodiments the acoustic coupling associated with the transducer front acoustic window 123 is configured as a hands free acoustic chamber which is coupled to the apparatus casing acoustic window to provide a suitable integrated hands free functionality. Thus in such embodiments the transducer side acoustic window 121 can be coupled to the front of the apparatus (in other words the apparatus casing front acoustic window) and provides earpiece functionality and the transducer front acoustic window 123 can be coupled via a suitable chamber to the rear or side of the apparatus (in other words the apparatus casing rear acoustic window or edge or side acoustic window) and can provide integrated hands free speaker functionality. It would be understood that in some embodiments the suitable chamber for the hands free functionality can be missing or negligibly small.

In the example shown in FIG. 2b there is additionally an edge or side dustproof gasket 122 over the transducer side acoustic opening 121 and 'front' dustproof gasket 125 over the transducer front acoustic window 123 which is 'in front' of the transducer vibrating membrane 105 both of which are configured to permit air to pass but not allow the entrance of dust or other foreign objects to the transducer. In some embodiments there comprises an air gap 131 between the magnet and the magnet pot.

As described herein the transducer or loudspeaker which is configured as shown according to some embodiments 'on edge' in relation to display/front cover of the apparatus permits the width of the transducer package to be defined by a dimension 161 smaller than the vibrating membrane width. In other words the transducer side acoustic window 121 permits the transducer vibrating membrane to have a relatively small 'horizontal' dimension. For example in some embodiments a package can have a horizontal dimension of 2.5 mm, the air gap or acoustic window 0.5 mm in diameter and the dimension 161 from the air gap, acoustic window and the rear of the transducer 1 mm. These dimensions are example dimensions but show that the distance between the acoustic window and the edge of the transducer can be typically very small when compared to the conventional width being much greater than 2.5 mm.

In some embodiments the transducer 111 is protected from foreign and contaminating objects by a dust trap located between the transducer 111 and the apparatus casing acoustic window 106. The dust trap in some embodiments comprises a first magnetic or mu-material layer configured to trap metallic objects and a support layer supporting the magnetic or mu-material layer close to the apparatus casing acoustic window 106.

Furthermore in some embodiments the mounting of the transducer with respect to the printed wiring board can be implemented by connectors or resilient members that support or couple the speaker or transducer to the printed wiring board layers.

In other words in some embodiments there is a transducer comprising: an air displacement component configured to move on application of an electrical signal to generate an acoustic wave in a first plane in the direction of the movement of the air displacement; and a transducer casing configured to mechanically support the air displacement component, wherein the transducer casing comprises an output window located and acoustically coupled to the air displacement component in a second plane wherein the angle between the first plane and the second plane is substantially in the range from 45 to 135 degrees. In some embodiments the angle between the first and second planes is substantially perpendicular (or in other words substantially 90 degrees or pi/2 radians).

Figure 4A:
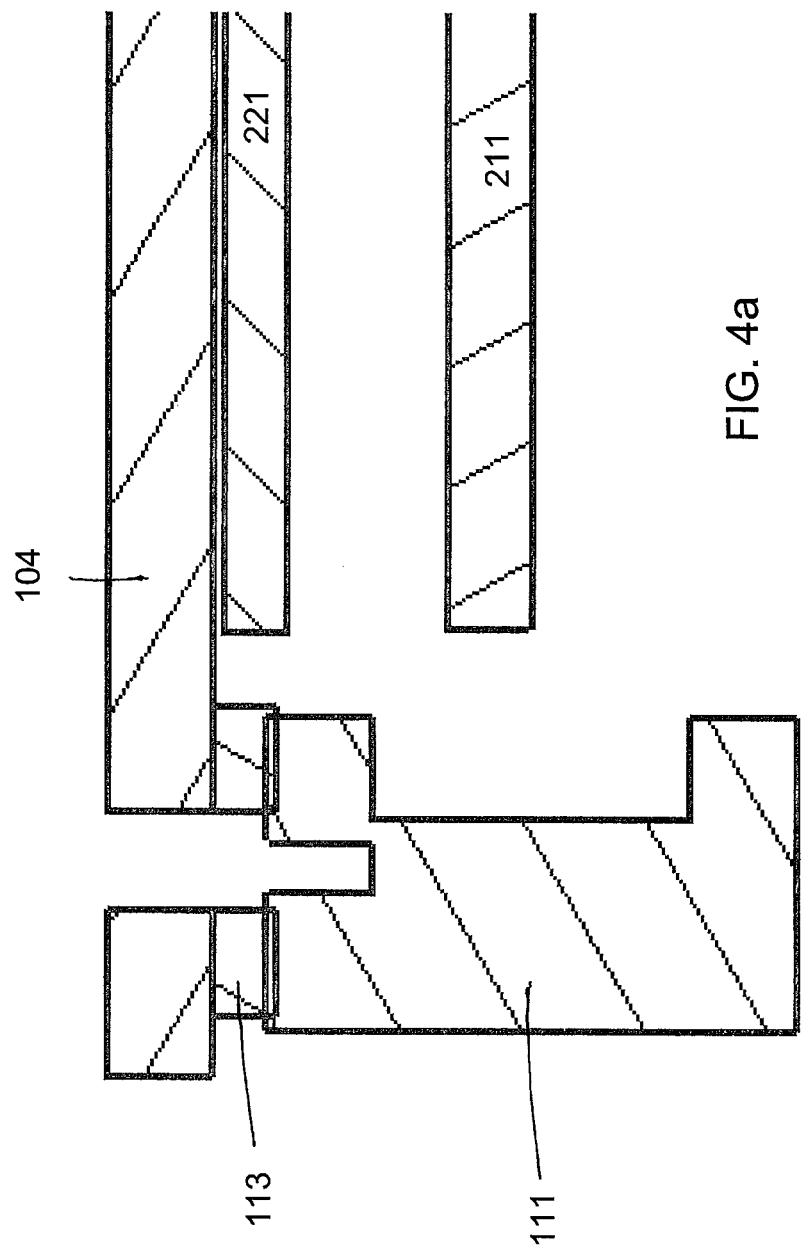
FIGS. 4a and 4b illustrate schematic section diagrams of an apparatus incorporating a speaker or acoustic transducer according to some embodiments.
Figure 4B:
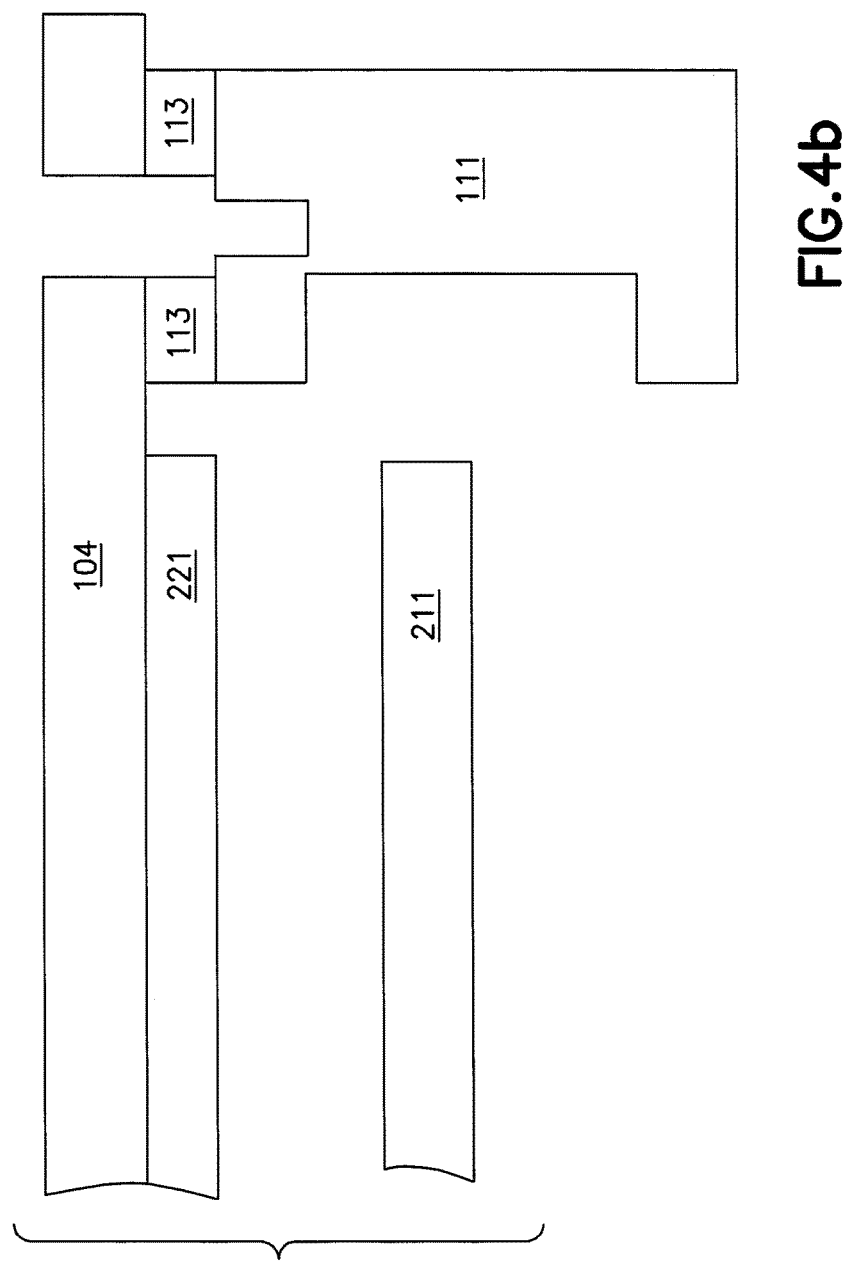

Implementation configurations of the transducer as described herein with respect to some embodiments of the application are further shown in the isometric projection FIGS. 3a to 3d and sectional FIGS. 4a and 4b.

As shown in FIGS. 3a to 3d the transducer 111 can in some embodiments be physically coupled to the casing 104 via a support 201. The support 201 can be any suitable support mechanism. Furthermore as is shown in FIGS. 3a to 3d the other internal components of the apparatus mounted on printed wiring boards (PWB) or printed circuit boards (PCB) 211 in relation to the transducer and casing 104. With respect to FIG. 3d the display assembly 221 is shown on the underside of the casing 104.

As shown in FIGS. 4a and 4b the sectioned views of transducer 111, acoustic coupling or gasket 113 configured to couple the transducer to the casing 101, a casing front side 104, display 221 and printed wiring board (or printed circuit board) 211 are shown demonstrating the 'narrow width' requirement of the transducer package according to some embodiments.

It shall be appreciated that the term portable apparatus is user equipment. The user equipment is intended to cover any suitable type of wireless user equipment, such as mobile telephones, portable data processing apparatus or portable web browsers. Furthermore, it will be understood that the term acoustic sound channels is intended to cover sound outlets, channels and cavities, and that such sound channels may be formed integrally with the transducer, or as part of the mechanical integration of the transducer with the apparatus.

In general, the various embodiments may be implemented in hardware or special purpose circuits, software, logic or any combination thereof. Some aspects of the application may be implemented in hardware, while other aspects may be implemented in firmware or software which may be executed by a controller, microprocessor or other computing apparatus, although the application is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing apparatus, or some combination thereof.

The embodiments of this application may be implemented by computer software executable by a data processor of the mobile apparatus, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the applications may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
 (a) hardware-only circuit implementations (such as implementations in only analog and/or digital circuitry) and
 (b) to combinations of circuits and software (and/or firmware), such as: (i) to a combination of processor(s) or (ii) to portions of processor(s)/software (including digital signal processor(s)), software, and memory(ies)

that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this application. However, various modifications and adaptations may become apparent to those skilled in the relevant arts in view of the foregoing description, when read in conjunction with the accompanying drawings and the appended claims. However, all such and similar modifications of the teachings of this application will still fall within the scope of this application as defined in the appended claims. Indeed there is a further embodiment comprising a combination of one or more of any of the other embodiments previously discussed.

The invention claimed is:

1. An apparatus comprising:
an air displacement component, said air displacement component being configured to move on application of an electrical signal to generate a first acoustic wave, in a first plane, from a first side of the air displacement component in a first direction of movement of the air displacement component; and
a casing mechanically supporting the air displacement component, wherein the casing comprises a first opening in the first plane for the first acoustic wave to travel into the first opening, wherein the casing includes at least one output window acoustically coupled to the first side of the air displacement component to generate a second acoustic wave, in a second plane, in a second direction different from the first direction of movement of the air displacement component, where the second direction of the second acoustic wave at the at least one output window is not the same as a first direction of the first acoustic wave, and the second direction of the second acoustic wave at the at least one output window is not in a direction opposite the first direction of the first acoustic wave.

2. The apparatus as claimed in claim 1, wherein an angle between the first plane and the second plane is substantially in a range from 45 to 135 degrees.

3. The apparatus as claimed in claim 2, wherein the first plane and the second plane are substantially perpendicular to one another.

4. The apparatus as claimed in claim 1 further comprising a second opening in the casing, where the second opening is coupled to a second side of the air displacement component.

5. The apparatus as claimed in claim 1, wherein the at least one output window is acoustically coupled to the first opening at the first side of the air displacement component.

6. The apparatus as claimed in claim 4, wherein the at least one output window is acoustically coupled to the second opening at the second side of the air displacement component, where the second side of the air displacement component is opposite the first side of the air displacement component.

7. The apparatus as claimed in claim 4, wherein the at least one output window has a smaller dimension than at least one of the first opening and the second opening.

8. The apparatus as claimed in claim 1, wherein the apparatus is an audio transducer.

9. The apparatus as claimed in claim 1 further comprising a device casing comprising at least one device output window acoustically coupled to the at least one output window, said at least one device output window being configured for outputting the second acoustic wave from the device casing to an exterior of the device.

10. The apparatus as claimed in claim 9, wherein the at least one device output window and the at least one output window are substantially in the same second plane.

11. The apparatus as claimed in claim 9, wherein the apparatus further comprises a printed wiring board, where the air displacement component is electrically coupled to the printed wiring board.

12. The apparatus as claimed in claim 9, wherein the apparatus is a portable electronic device.

13. The apparatus as claimed in claim 1, wherein the apparatus has
a width, said width being a longest physical dimension defined by an air displacement component width; and
a height, said height being a shortest physical dimension defined by a maximum displacement of the air displacement component.

14. The apparatus as claimed in claim 1, wherein the air displacement component comprises a vibrating membrane.

15. The apparatus as claimed in claim 9 where the at least one device output window is acoustically coupled to the first opening of the casing.

16. The apparatus as claimed in claim 9 where the first opening faces in an internal direction into the device casing.

17. The apparatus as claimed in claim 9 where the first opening is acoustically coupled to a rear of the device casing.

18. The apparatus as claimed in claim 1 where the casing comprises another opening acoustically coupled to an opposite second side of the air displacement component for a third acoustic wave in a third plane.

19. The apparatus as claimed in claim 1 where second acoustic wave is generated by the air displacement component in response to the electrical signal such that the apparatus is configured to generate both the first acoustic wave and the second acoustic wave in response to the application of the same electrical signal to the air displacement component.

20. A method of operating a transducer comprising:
moving an air displacement component on application of an electrical signal to generate a first acoustic wave, in a first plane, from a first side of the air displacement component in a first direction of the movement of the air displacement component;
mechanically supporting the air displacement component by a casing, wherein the casing comprises a first opening in the first plane for the first acoustic wave to travel into the first opening;
providing at least one output window in the casing, said at least one output window being acoustically coupled to the first side of the air displacement component to generate a second acoustic wave, in a second plane, in a second direction different from the first direction of movement of the air displacement component, where the second direction of the second acoustic wave at the at least one output window is not the same as a first direction of the first acoustic wave, and the second direction of the second acoustic wave at the at least one output window is not in a direction opposite the first direction of the first acoustic wave.

21. The method as claimed in claim 20, wherein an angle between the first plane and the second plane is in a range of about from 45 to 135 degrees.

22. The method as claimed in claim 20, further comprising:
providing a device casing having at least one device output window acoustically coupled to the at least one output window of the casing, wherein an angle between the at least one device output window and the at least one output window is in a range of about 45 to 135 degrees.

23. An apparatus comprising:
a membrane configured to generate, on application of an electrical signal to a member connected to the membrane, a first acoustic wave in a first direction by displacing air, in a first plane, at a first side of the membrane in a first direction of movement of the membrane; and
a casing mechanically supporting the membrane, wherein the casing comprises a first opening in the first plane for the first acoustic wave to travel into the first opening, wherein the casing comprises at least one output window acoustically coupled to the first side of the membrane to generate a second acoustic wave, in a second plane, in a second direction different from the first direction of the first acoustic wave such that the first acoustic wave in the first plane and the second acoustic wave in the second plane are acoustically coupled, where the second direction of the second acoustic wave at the at least one output window is not the same as the first direction of the first acoustic wave, and the second direction of the second acoustic wave at the at least one output window is not in a direction opposite the first direction of the first acoustic wave.

24. The apparatus as claimed in claim 23, wherein an angle between the first plane and the second plane is in a range of about from 45 to 135 degrees.

25. The apparatus as claimed in claim 23, wherein the first plane and the second plane are substantially perpendicular to one another.

26. An apparatus comprising:
an air displacement component, the air displacement component being configured to move on application of an electrical signal to generate a first acoustic wave, in a first plane, in a first direction from a first side of the air displacement component in a first direction of movement of the air displacement component; and
a casing mechanically supporting the air displacement component, where the casing comprises a first opening in the first plane for the first acoustic wave to travel into the first opening, where the casing includes at least one output window acoustically coupled to the first side of the air displacement component to generate a second acoustic wave, in a second plane, in a different second direction, where the second direction of the second acoustic wave at the at least one output window is not in a direction opposite to the first direction of the first acoustic wave.

27. An apparatus as in claim 26 where the at least one output window is configured to output the second acoustic wave in a direction which is not the same as a direction of the first acoustic wave out of the first opening.

* * * * *